United States Patent [19]
Mecum

[11] Patent Number: 5,733,127
[45] Date of Patent: Mar. 31, 1998

[54] TOUCH PERCEPTIBLE FLOOR PLAN MAP AND METHOD FOR USE

[76] Inventor: Robert Charles Mecum, 5202 Rustling Oaks La., McFarland, Wis. 53558

[21] Appl. No.: 431,447

[22] Filed: May 1, 1995

[51] Int. Cl.$^6$ .................................................. G09B 21/00
[52] U.S. Cl. .................................................. 434/113; 40/585
[58] Field of Search ........................ 434/112, 113, 434/72, 73, 79, 80, 152; 40/585, 622, 620; 116/205

[56] References Cited

U.S. PATENT DOCUMENTS

| | | |
|---|---|---|
| 2,523,828 | 9/1950 | Howe. |
| 3,659,353 | 5/1972 | D'Agrosa. |
| 4,385,586 | 5/1983 | Schriever. |
| 4,401,050 | 8/1983 | Britt et al.. |
| 4,679,342 | 7/1987 | Wilson ........................ 40/616 |
| 4,880,384 | 11/1989 | Murphy. |
| 5,246,757 | 9/1993 | Condon et al. ............... 428/40 |
| 5,438,781 | 8/1995 | Landmann. |

FOREIGN PATENT DOCUMENTS 3604609  8/1987  Germany.

OTHER PUBLICATIONS

"'Tactile' Maps Will Help Blind Get Around in D.C.", Beck, Jody, Washington Star Staff Writer, Washington Star (Newspaper), p. B2, Mar. 3, 1975.

*Primary Examiner*—Jeffrey A. Smith
*Attorney, Agent, or Firm*—Loyd W. Bonneville

[57] ABSTRACT

Device and method of employment thereof relating to tactile map of a bathroom or other area of interest for use by visually impaired persons, comprising tactile symbols emplaced upon a plaque or underlying surface such as a wall or door proximate the area.

3 Claims, 8 Drawing Sheets

TOUCH PERCEPTIBLE FLOOR PLAN MAP AND METHOD FOR USE

BACKGROUND OF THE INVENTION

1. Field of the Invention

Objects for tactile communication to persons of impaired vision

2. Description of the Prior Art

Recognition of the particular needs of a blind person in public buildings, parks, arenas or other places has become an increasing priority in our society. Whether accompanied by another in such a place or not, intimate familiarity with the area's spacial configuration and the relative placement of furnishings and fixtures within it are considerably useful to a blind person. This is especially true of public restrooms in instances in which it is cumbersome for the accompanying attendant to enter with the blind subject as where the two persons are of different sex. When a blind person enters a restroom for the first time, he or she is relegated to feeling along the walls, partitions and fixtures themselves in order to use the facility. Those difficulties are obviated if a readable representation of the interior of the room, a tactile map of the restroom, is available. For other areas of concern to a blind person as well, that sort of area plan would be similarly useful. Such a map must have its subject matter embossed upon or cut into its surface so that a blind person can interpret the shape of the room or area and the relative placement of fixtures or other objects within it by what is sometimes referred to as palpation—that is, by tactile observation, or means of touch perception or sensing.

Embossments in braille as a means of communication to a blind person by way of palpation have been widely known in literature format and similar media for more than a century. Elevator control panels in public buildings provide an example of such use in signage. More recently, communication of that sort is being accomplished employing numerals or alphabetic letters constructed in what is sometimes called bold relief or raised fashion. Prior art discloses as references U. S. Pat. No. 4,679,342 issued to Wilson and U.S. Pat. No. 5,246,757 issued to Condon and others. The first of those two consists of a surface bearing either cutout or embossed letter or numerical indicia matching and overlying otherwise solely visual representations which had been emplaced on a control panel without regard to blind persons. The other comprises signage requiring, among other things, a type of porous material suggested by the inventors to be optimally suitable to heat and vacuum molding techniques. Aside from the fact that it addresses only words and numerals as communicable symbols, the Wilson device is limited to recharacterizing existing signage or other forms of panelled communication such as a household appliance control device from nontactile to tactile. Although the Condon patent adds "graphic, including pictures, symbols, logos and the like" and numerals in its definition of alphanumeric characters, neither that nor the Wilson patent addresses spacial orientation or locator communication such as that conveyed by the map or floor plan characteristics embodied in the present invention (1). Furthermore, it is unclear from the Condon patent what is actually meant by the term "graphic", since the logic of its use is circular therein. While the term is specified as part of the definition of alphanumeric in the disclosure, it is used in the claims to comprise in turn characters which are alphanumeric. An attempt to define a word in terms of the word itself fails as a true definition. For both reasons, references to "graphic" in the Condon patent do not preempt the shapes applicant employs herein. Concerning the first of those reasons, it is the map feature of applicant's invention (1) summarized ante, that renders novelty to it.

SUMMARY OF THE INVENTION

The present invention (1) is both a useful device in and of itself as well as a method by which it may be configured, assembled and employed to fulfill its objectives. The device (1) is a map of an area of interest to an observer, such as a blind person, who might otherwise experience difficulty or inconvenience in locating himself or herself with reference to that area and finding his or her way through and about it. The area of interest might, for example, be a public bathroom, interior of a building complex or a park. In the claims and otherwise throughout this specification, the terminology is sometimes shortened merely to "area". The map (1) is mounted at a place near its entrance. In the case of a public bathroom, it would be mounted either upon its door or upon the wall near the entrance. It is tactile in configuration, having as tactile symbols (2) for it either embossments (3) upon or cutouts (4) within the observable surface of a plaque (5, 25) or underlying surface (6, 125) and is accordingly observed by means of palpation of the symbols (2, 103). The phrase "observable surface" is consistently recited in the claims as the portion of the plaque (5, 25) palpated by the observer. As that phrase suggests, that portion of the plaque (5, 25) is the one which, following the device's (1) installation, is oriented in the direction of the observer, or "user" as occasionally referred to herein. The shape of the surface of a symbol (2, 103) exposed toward the person for observation must consistently represent a given object of interest within the area. The symbols (2, 103) must also be arranged so as to represent the positional relationships of the objects of interest with reference to one another. Thus, by palpating the map (1), the observer may become informed of the general layout of the area and the location of objects of interest within it.

The device (1) may be of one part construction comprising both symbols (2, 103) and plaque (5, 105); may be an assemblage of separate parts comprised both of the individual symbols (2, 103) and the underlying plaque (5, 25) to which they may be attached; or may be an arrangement only of the individual symbols (2, 103) emplaced upon an existing background surface (6, 125).

Because the layout of one particular area of interest will in many instances differ from that of another, it is readily recognized that there can be no single configuration to the device (1) itself. It has, therefore, been claimed not solely as a device (1) but also as a method of fulfilling its objectives. Considered as a method of assembly, the map (1) may, thus, be prepared to take into account individual differences in layout of a particular area of interest and the positional relationships of objects within it.

BRIEF DESCRIPTION OF THE DRAWINGS

FIGS. 1–13 represent various views of a generally rectangular embodiment of the invention (1). They are, respectively.

FIGS. 6–13 represent perspective views of an assortment of a typical variety of tactile symbols pegged tactile symbols (103) bearing pegs (28) upon their undersides (23) for attachment into a pegboard surface (25 FIG. 18, discussed ante). Symbols shown in the drawings to be without pegs (28), are provided reference numbers which result by subtracting 100 from that indicated for each when pegged (103). Unpegged embossed symbols (2, 3), therefore, have numbers (3), (9–11) and (13–19) and they are thus shown in FIGS. 1–5. Examples are: An unpegged rectangle with a wheel atop it (10), a toilet with wheelchair access; an unpegged rectangle with a circular or ovoid well cut into its surface (11), a washbasin; an unpegged rod-like extension of various lengths (13), a wall section in general; an unpegged rod-like extension of relatively great length near the perimeter of the map (14), a perimeter enclosure; an unpegged rod-like extension of relatively shorter length in areas within the perimeter (15), an interior area division or separater; a simple unpegged rectangle (16), a toilet; an unpegged triangle (17), a urinal; an unpegged small cylinder (18), a roll of toilet paper; a relatively longer unpegged cylinder (19), a hand towel rack or disposer or an electric hand dryer; and a relatively short unpegged rod-like extension (27), a door. Similarly, the elements of a symbol such as the face (7, 107), the perimeter walls or sides (8, 108) or underside (12, 112) are numbered to reflect this pegged or unpegged difference. The pegged symbols (103) included in FIGS. 6–13 are depicted as follows: FIG. 6—cloverleaf shape representing an electric fan switch (109); FIG. 7—rectangle with wheel-like structure atop representing a toilet accessible by and suitable for a disabled person (110); FIG. 8—rectangle with ovoid well cut into its surface representing a washbasin (111); FIG. 9—two rod-like extensions representing perimeter segments for area of interest or enclosure (114); FIG. 10—three rod-like extensions representing area division segments of the interior of the area of interest such as for stalls (115), the reference number (113) having application to both of those types of extensions; FIG. 11—two simple rectangles representing toilets (116); FIG. 12—three triangles representing urinals (117); FIG. 13—three small cylinders representing toilet paper rolls (118) a lengthened cylinder representing a hand towel roll or dispenser or an electric hand dryer (119 and FIG. 19)

DESCRIPTION OF THE PREFERRED EMBODIMENT

References are made in the claims and otherwise throughout this application to various forms of the words "tactile" and "palpable". The use of any of those variations herein means that a particular thing is capable of being observed through sense of touch; feeling it with one's fingers so as to ascertain its shape. Consistent with that definition, "Tactile observation" means observing an object "palpably". The term "map" as applied to the invention (1) means that observations of its features permit one to determine his or her own location and devise a route in relation to certain reference points in the area represented. In the instance where the map (1) depicts an interior area such as a bathroom, it may be thought of as a floor plan. The "map" portion of the phrase "tactile map" (1) is used instead of "floor plan", however, because of the invention's (1) possible application to outdoor areas such as parks and playgrounds.

Maps in general depict features which represent objects in a particular "area of interest", a term occasionally shortened herein to "area". The positional relationships of the map features to one another represent the positional relationships of objects of interest within that area. The terminology used in the claims to describe the invention's (1) map features is "tactile symbols" (2, 103), occasionally shortened to just "symbols" (2, 103). In the interest of more precisely defining the concept of a map's representation of objects of interest and their relationship to one another, one might consider as an example the positional relationships of three objects within a given area. If those three objects were properly depicted in that representative manner, the map would display for observation three respective symbols between all of which the angles and distances of separation would in a representative sense approximate those concerning the objects. Such maps are usually characterized as being more or less "to scale", if not exactly so. The claims employ formalized terminology to describe that relational concept by requiring that every member of a given class of objects be represented by a distinct one of the tactile symbols (2, 103) and each class of objects be represented, respectively, by a different one of the tactile symbols (2, 103). The classifications themselves are discussed further ante.

For sighted persons, those who can see, a conventional paper map upon which the features are merely printed, such as one for highways, accomplishes the desired objective of representing the positional relationships of objects within an area of interest. Applicant's invention (1) differs from conventional maps in that its features are displayed thereon in a way which can be observed by palpation and, therefore, may be relied upon by a blind person. All of the embodiments of the invention (1) are, thus, "tactile" ones and that term is accordingly used in conjunction with the word "map" as part of the invention's (1) name throughout the claims. In other parts of this specification, the expression "tactile map" (1) may be shortened to just "map" (1).

The invention (1) is made tactile in either of two ways. One way is by means of "embossments" (3) upon the "plaque" (5, 25) thereof. As used in the claims, the word "plaque" (5, 25) merely means a base upon which symbols are formed and is distinguished in meaning from the underlying wall or other surface (6, 125) upon which an embodiment of the invention (1) comprising a plaque is mounted. Various ways in which the plaque (5, 25) may itself be configured or selected are discussed further ante. Embossments (3) are symbols (2, 103) which may be thought of as rising outward from the plaque (5, 25) toward the observer in bold relief.

Figure 16:
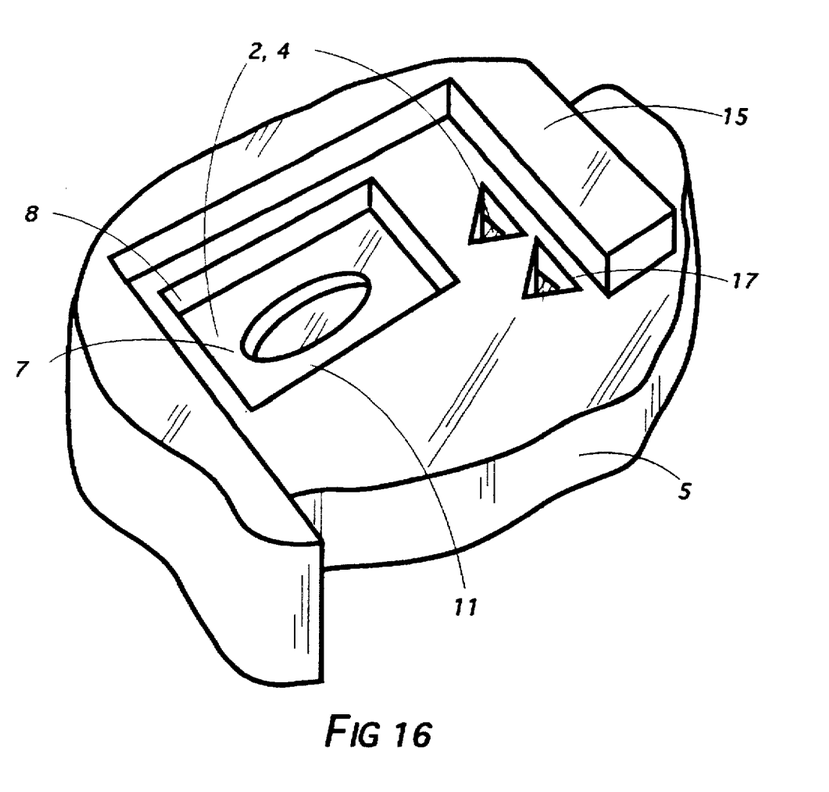
FIG. 16—a plaque upon which cutouts (4) have been formed showing those for a washbasin and two urinals (11 and 17, respectively)
Figure 17:
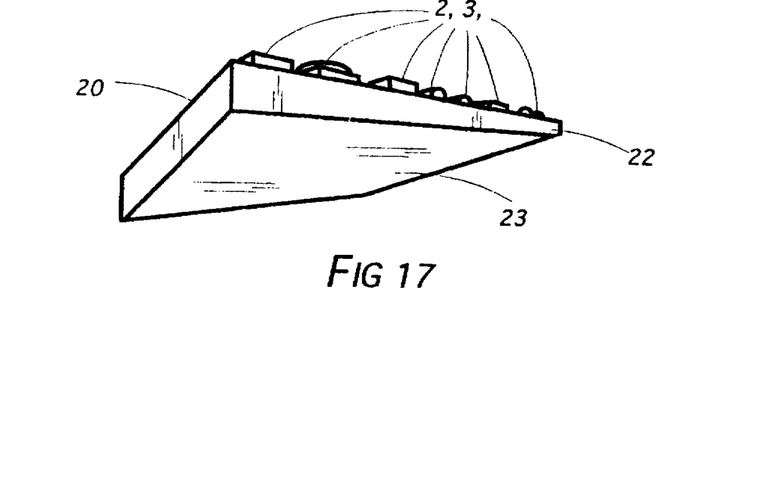
FIG. 17—an unpegged key underside (22)
Figure 18:
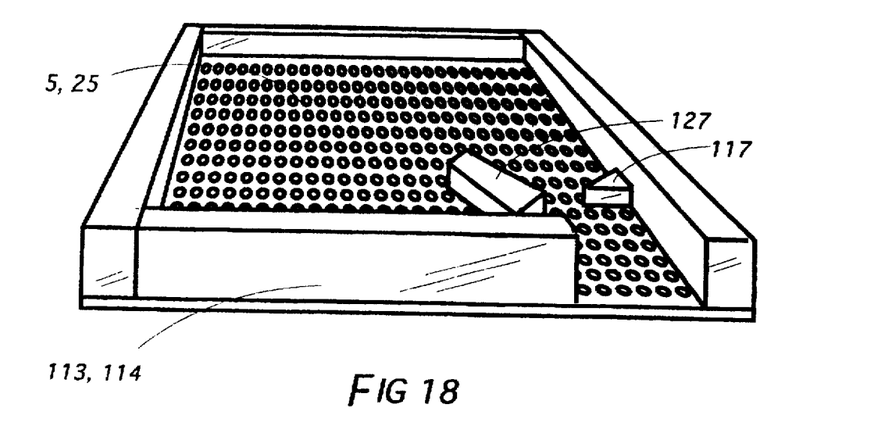
FIG. 18—a plaque (5) of pegboard (25)
Figure 19:
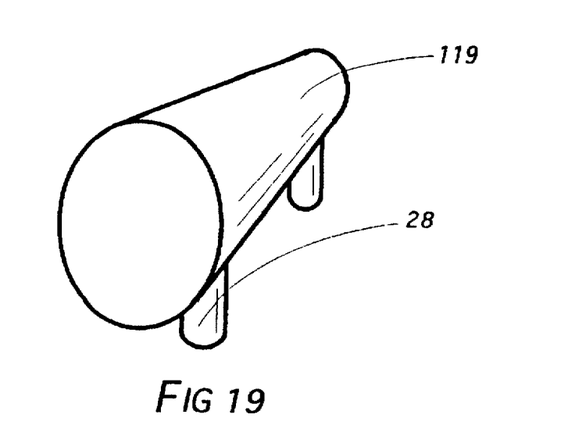
FIG. 19—a relatively long pegged cylinder (19), representing a hand towel rack or disposer or electric hand dryer.
Figure 20:
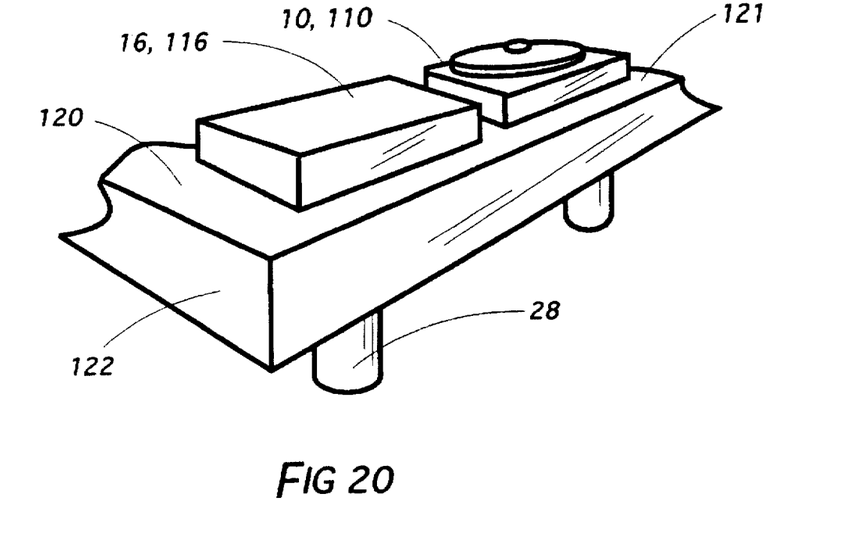
FIG. 20—a portion of a pegged key (120)
Figure 21:
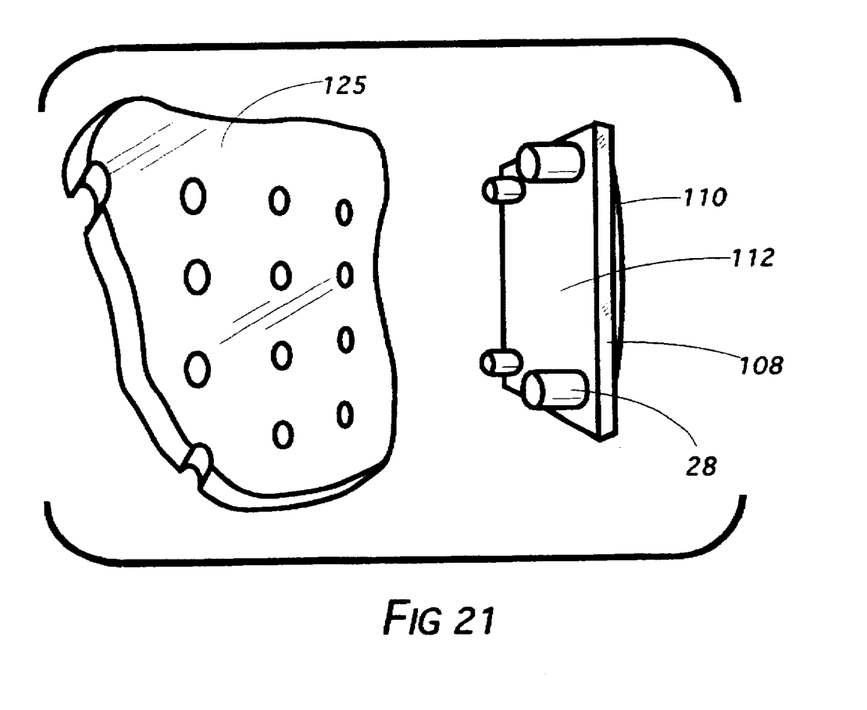
FIG. 21—The underside of a pegged triangular symbol (117), representing a urinal, and the underlying pegboad surface (125) upon which it is to be emplaced.

The other way the invention (1) can be made tactile is by means of "cutouts" (4) into the plaque (5) thereof. As used in the claims, that word means that the symbols are depressions, wells or sculpted out carvings in the plaque (5). Examples of cutouts (4, specifically 11 and 17) are shown in FIG. 16. Both the embossment representing a washbasin (11) and that representing an electric fan switch (9) have cut into their faces features configured like cutouts (4). Whether it is an embossment (3) or a cutout (4) that is under observation, one may by means of palpation ascertain the shape of the map symbol (2) portrayed. As between embossments (3) and cutouts (4), the former are the preferred choice. Some blind persons, particularly some who have been afflicted with diabetes, have little or no touch sense in their fingertips. They might successfully interpret an embossment (3), however, by employing more than one finger or by sensing with a portion of the finger other than the tip itself. For them, embossments (3) are more accessible than cutouts (4).

The term "emplaced" is occasionally used in this application to describe the symbol's (2) being caused to become constructed upon the plaque (5), whether as an "embossment" (3) or a "cutout" (4).

Objectives of the invention (1) are stated in this application to include one's ability in using it to become informed both of the "layout of the area represented" and the "respective positional relationships of objects therein". Becoming informed of the "layout" of the area of interest merely means discovering or ascertaining the overall way in which the area is oriented and arranged; whether it is generally rectangular as opposed to square or L shaped; whether it extends predominantly in a longitudinal direction from the direction of the entrance or instead, in a lateral one therefrom; whether, if the area of interest is a public bathroom, the toilets or other fixtures are to the left of the entrance as opposed to the right; the direction in which the stall doors open; and other such orientation characteristics. Becoming informed of the "respective positional relationships of objects" in the area of interest refers to the map's (1) capability by reason of the arrangement of the respective symbols (2, 103), again in the case of a public bathroom, to inform one of the location of the washstands with respect to the urinals or ascertain the placement of other objects of interest therein relative either to each other or to the general layout.

Figure 14:
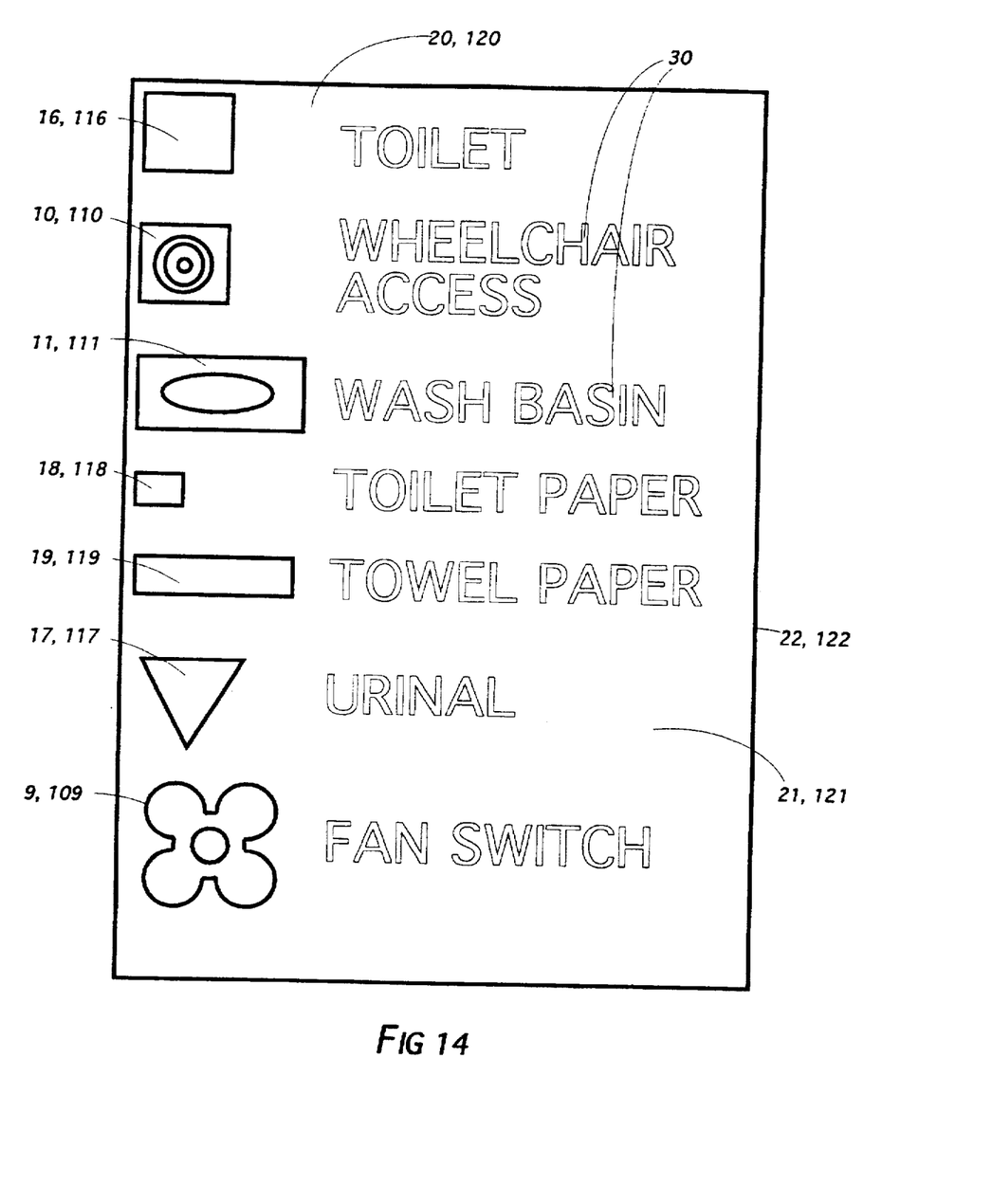
FIG. 14—a key (20) to the meaning of the symbols.
Figure 15:
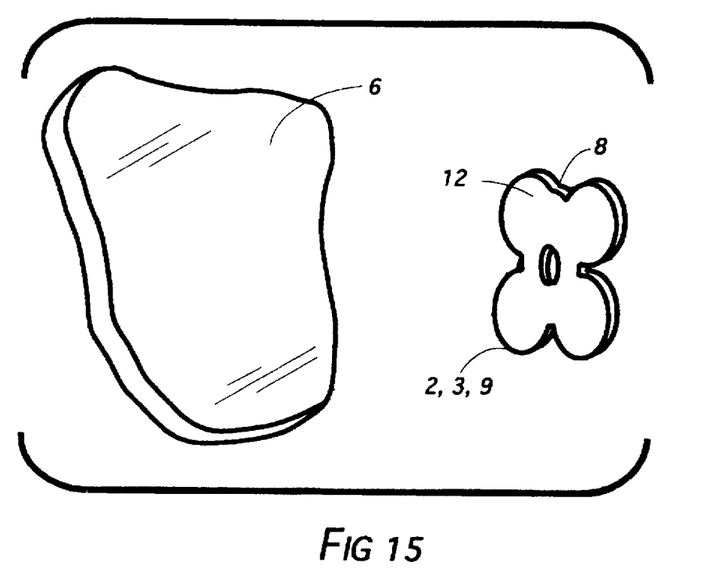
FIG. 15—the underside of an unpegged coverleaf symbol (9), representing a fan switch and the underlying surface upon which it is to be emplaced.

The mere arrangement of the symbols (2, 103) with respect to one another is not the sole determinant concerning this second aspect of what might be learned from palpating them. The phrase "tactile symbols" (2, 103) is a commonly understood one meaning in part that they are so shaped that one may by means of palpation ascertain differences between them. Whether the symbols (2) are embossments (3) or cutouts (4), discussed supra, they comprise three dimensions. The surface exposed directly to the observer, referred to as the "face" (7, 107) thereof in the claims, may be the only one made readily distinguishable by tactile means. The phrase "tactile symbols" (2, 103) is generic in character in the sense that it may include a face (7, 107) shaped like alphabetic letters (See lettered narrative (30) in FIG. 14); numbers; braille dot systems (29); commonly recognized elementary geometric forms such as squares, circles, triangles, rectangles, ovals and ellipses irregularly shaped objects which may either be a combination of such commonly recognized geometric shapes or in a configuration not resembling any of them; and shapes which to a greater or lesser extent resemble or mimic in a miniaturized fashion those of the objects they represent. Such mimicry may, thus, portray the object of interest very exactly or may do so only in a stylistic sense. All of the foregoing are symbols (2, 103) presenting a face (7, 107) to the observer. However, three dimensional configurations for which the tactile portions include not only the face (7, 107) but the perimeter walls (8, 108) as well may be employed in the invention's construction. Thus, tactile surfaces might disclose to the observer shapes such as those of cubes, spheres or pyramids of a given number of sides; or three dimensional shapes comprising a combination of configurations such as egg-shaped, cylindrical or squared on the ends but rectangular longitudinally. Common experience teaches that all of such symbols (2, 103) are "tactile". To confer "tactile" character upon a symbol (2, 103), however, does not require that it be limited to any of those arbitrary shapes. Any tactile three dimensional shape one may devise may be emplaced upon the plaque (5, 25). A cube is no more suitable to represent a toilet than would be a shape oriented to expose a face (7, 107) to palpation of the circular end portion of a cylinder, a multi-sided pyramid or any other three dimensional shape. To meet this part of the test of palpability, it is only necessary that the observer be able to understand the symbol's (2, 103) shape. The shape must, thus, be a readily recognizable one not easily confused with another.

Figure 1:
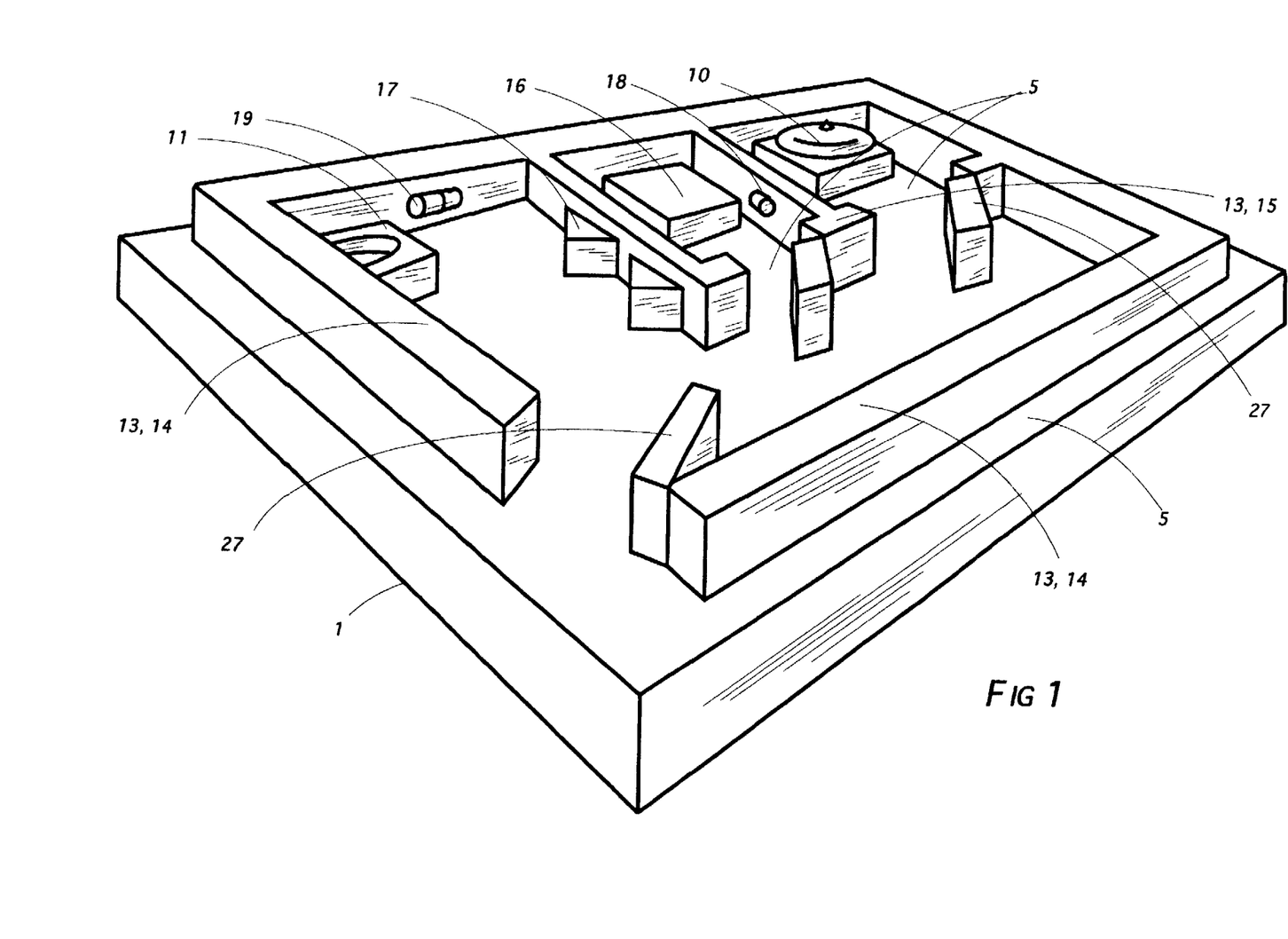
FIG. 1—perspective.
Figure 2:
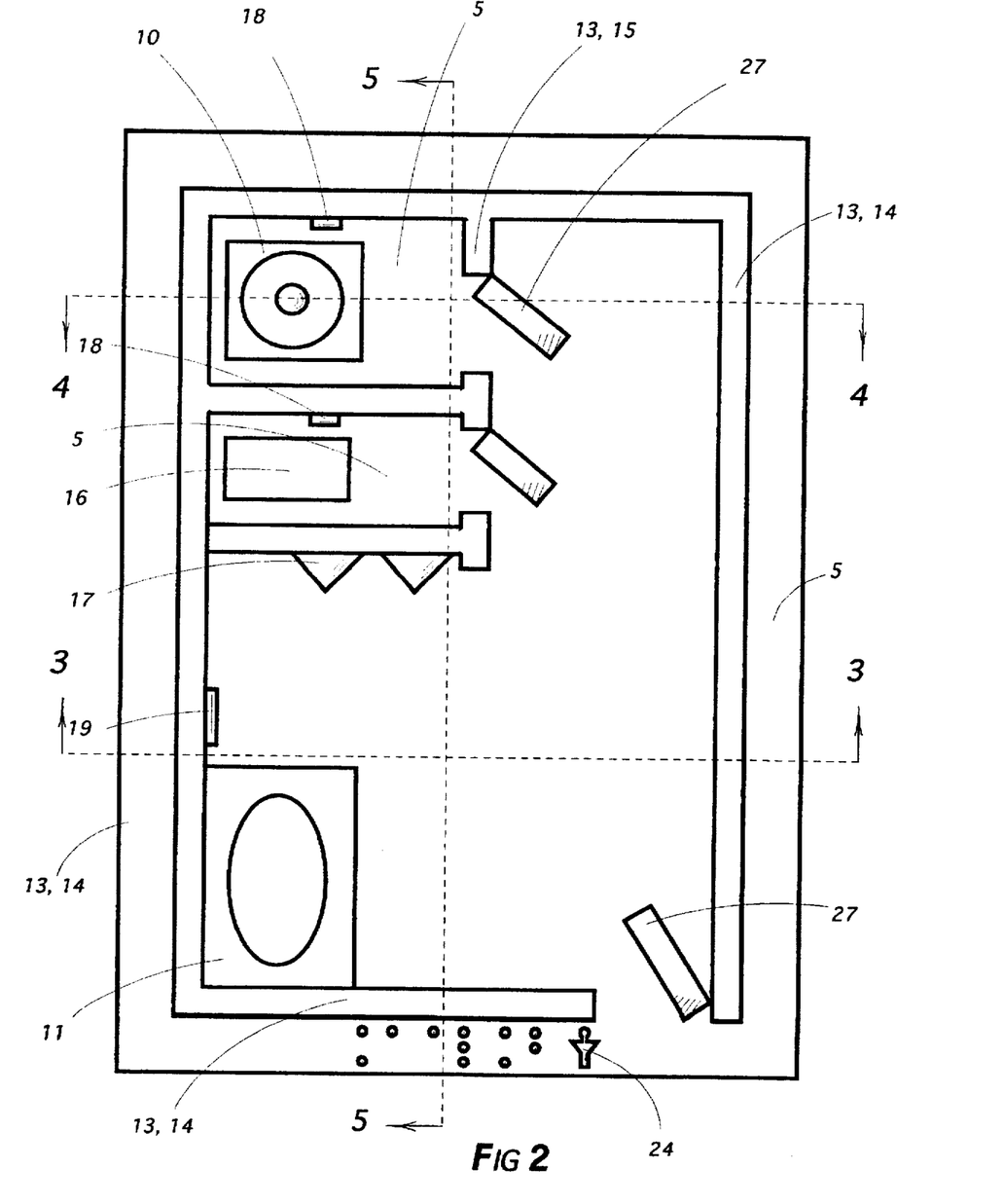
FIG. 2—face.
Figure 3:
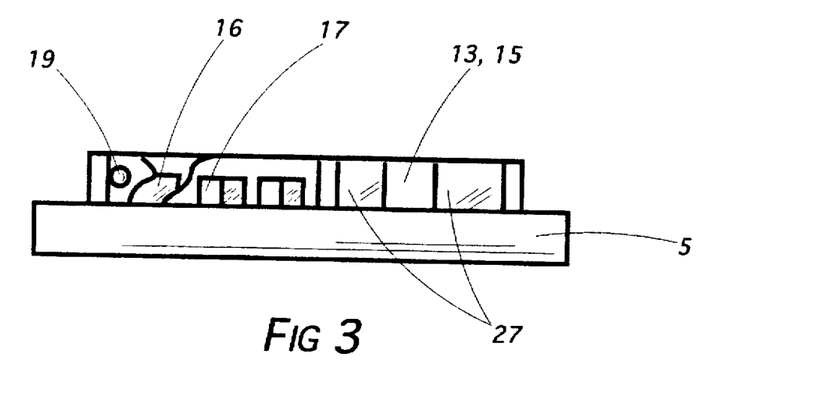
FIG. 3—cross section oriented along line 3—3 of FIG. 2.
Figure 4:
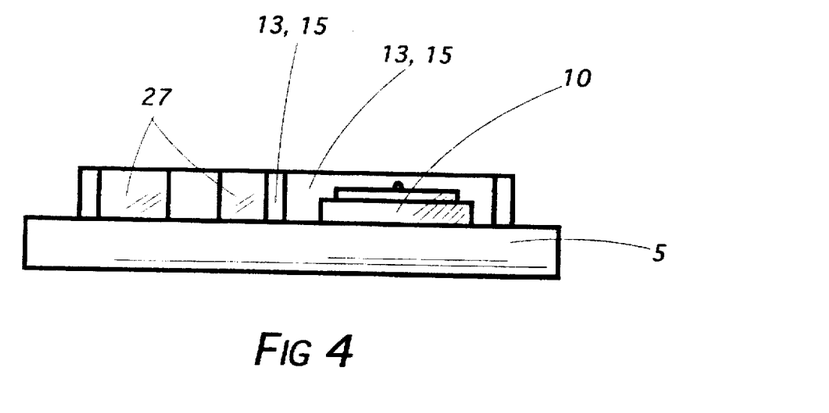
FIG. 4—cross section oriented along line 4—4 of FIG. 2.
Figure 5:
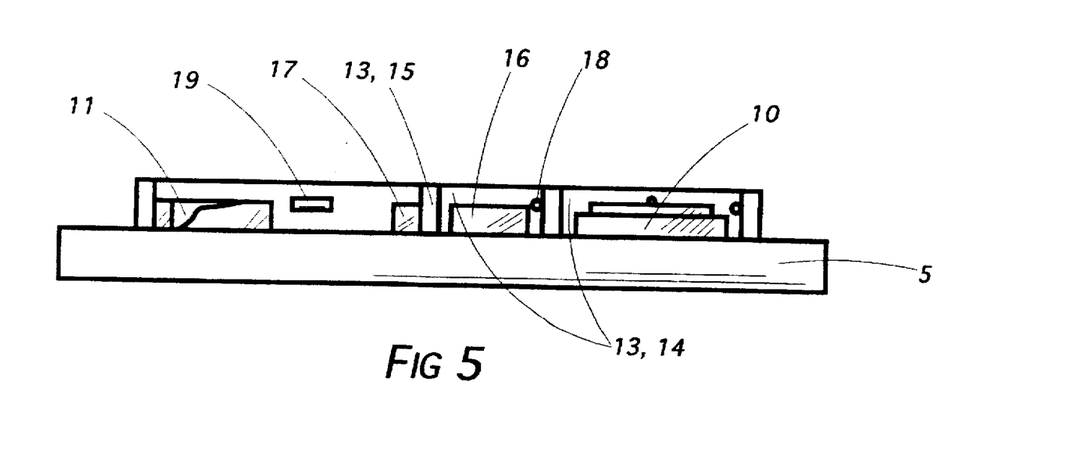
FIG. 5—cross section oriented along line 5—5 of FIG. 2.
Figures 6, 7, 8, 9, 10, 11, 12, 13:
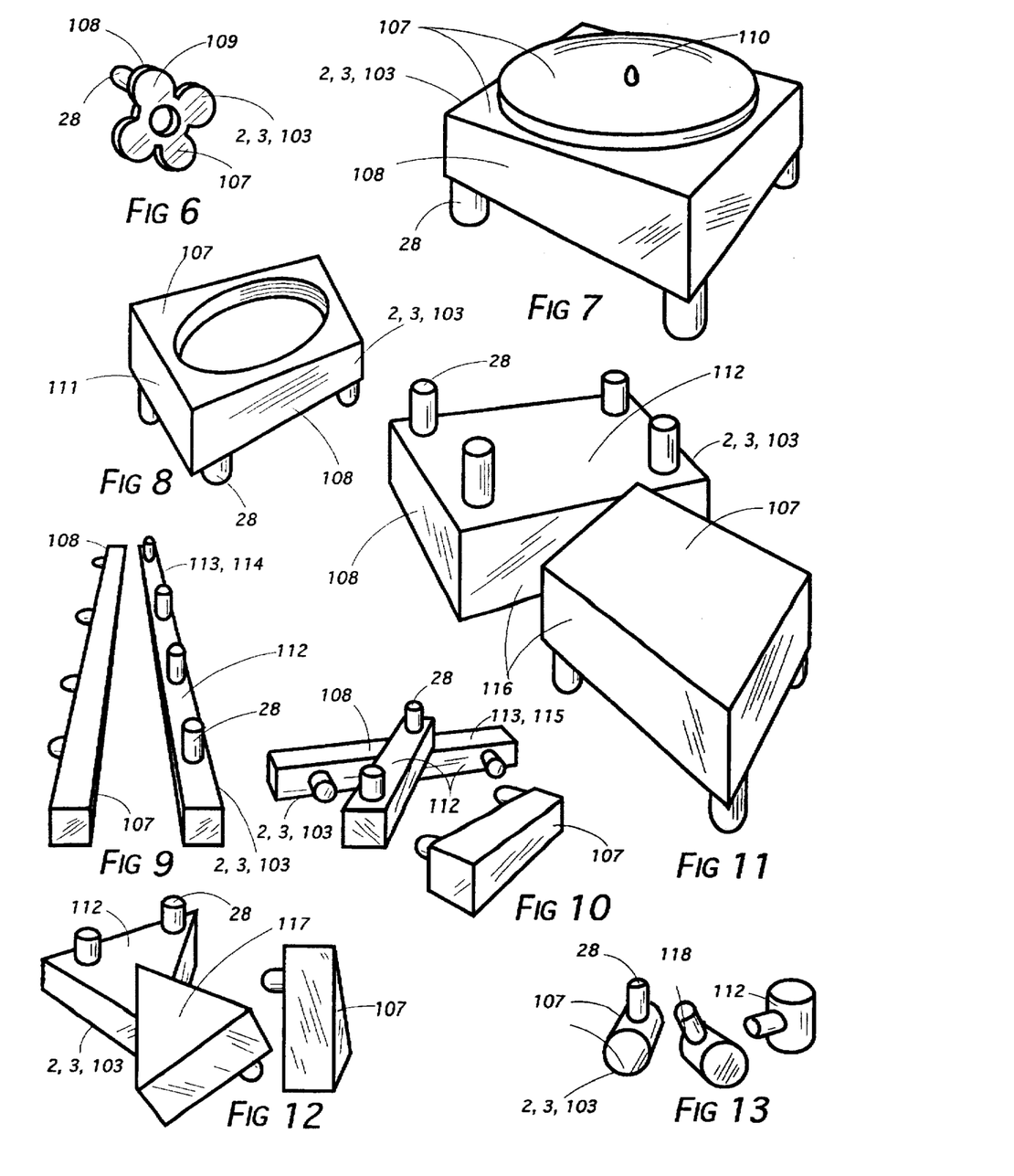

While it has been thus pointed out that in making the invention (1), one may configure the symbol (2, 103) in any shape which may arbitrarily be designated to represent a given object of interest within the area represented, there are advantages in preparing symbols (2, 103) shaped to mimic to a degree the objects of interest they represent or relate to. Thus, in a public bathroom setting, a three dimensional configuration having an exposed tactile face (7, 107) in the shape of a four-leaf clover (9, 109) might be recognized to represent a fan switch because the symbol's (2) shape resembles the blades of a fan. As depicted in FIGS. 6–13, one (110) symbol (2) has the shape of a cube with the three dimensional shape of two concentric circles lying atop it with a small pip, or protrusion, in the center of the two circles. The configuration of the shape lying atop the cube is to some degree reminiscent of a wheel lying upon its side with the tip of its axle protruding from its center. That symbol (110) was deliberately configured to represent a toilet having wheelchair access. One (111) of the symbols (2) disclosed in FIGS. 1, 2 and 8 is that of a three-dimensional rectangle with an oval cut out from its face. That symbol's (111) shape was deliberately configured to resemble a washbasin. The same is true of the unpegged symbols (2), (9–11 and 13–19) shown in FIGS. 1–5, whose reference numbers, as indicated, supra, are arrived at merely by subtracting 100 from those indicated in FIGS. 6–13 and 19.

To fulfill the invention's (1) objectives, however, each "tactile symbol" (2, 103) must represent a given object of interest consistently and be distinguishable from every other shape emplaced (2, 103) which represents a different object of interest. Thus, one would not emplace a triangle (17, 117) to represent a first urinal and a simple rectangle (16, 116) to represent a second one; and one should select shapes for urinals which resemble as little as possible those selected for washstands. Accordingly, the claims require such consistency concerning a given "class" of symbol (2) employment, discussed supra.

In some embodiments of applicant's invention (1), manufacture is from a single piece. Whether they are embossments (3) or cutouts (4), the map's tactile symbols (2), any key (20, discussed ante) and the plaque (5) upon which they are emplaced may be carved from one piece of wood or cast as a single piece from a metal or plastic mold. Situations in which this one-part embodiment may be employed are discussed in more detail ante.

In other embodiments of the invention (1), the plaque (5, 25) and the "tactile symbols" (2, 103) are made of separate parts. Any included key (20, 120) may either be part of the plaque (5, 25) or separate from it. Situations in which such an embodiment of separate parts may be employed are also discussed in more detail ante. To make an embossed (3) embodiment of the invention (1) from separate parts, three dimensional block-like pieces shaped as described supra and any separately included key (20, 120) are attached to the plaque (5, 25). Attachment of unpegged symbols (2, 3) may be accomplished upon what the claims designate as the symbol's "underside" (12, 112) by means of welding, bolting, stapling, applying an adhesive, or by other aesthetically acceptable fastening means known in the prior art. Pegged symbols (103) may also be so fastened. As mentioned supra, some embodiments of the invention are constructed so that the symbols in general (2), regardless of whether or not they are pegged, are separate from the plaque (5, 25) or underlying surface (6, 125) requiring their emplacement thereon. Claims referring to those embodiments differ from others by omitting references to "embossments" (3) and "cutouts" (4) and include as part of the symbol's (2, 103) elements a "face" (7, 107), "perimeter walls" (8, 108) and the attachable "underside" (12, 112). In those embodiments in which the invention (1) is not of one-part construction but is without a plaque (5, 25) upon which the symbols (2, 103) would otherwise be attached, a portion of a wall, post, door or other underlying surface itself (6, 125) proximate the area of interest may serve in lieu of a "plaque" (5, 25) as the surface upon which the symbols (2, 103) are emplaced.

Employed as a representation of a public bathroom, applicant's invention (1) would represent the location of partitions, walls, doors, toilets, washbasins, urinals, toilet paper, hand towel paper roll and any other objects of interest therein. Indeed, it is probably for public bathrooms that a tactile map (1) would find its most valuable application.

Each object of interest is consistently represented by a distinctly shaped symbol (2, 103). Even an illiterate or one of foreign tongue can, therefore, use the device (1). The objects of interest the symbols (2, 103) represent are alluded to throughout the application. In the embodiments depicted, some of the "tactile symbols" (2, 103) are of arbitrarily assigned three dimensional shapes having faces (7, 107) in the shapes of squares or rectangles (16, 116), circles (10, 110, showing them atop a rectangle or square) and triangles (17, 117). Others are distinguishable not by their faces (7, 107) but by the entirety of their structure. Those include the cylinders (18, 118, 19, 119) representing the toilet paper rolls and the hand towel roll, dispenser or electric hand dryer, respectively. Still others are distinguishable because their shape mimics that of the object they represent. Among those are the cube with the wheel lying atop (10, 110), representing a wheelchair accessible toilet; and the cloverleaf shaped symbol (9, 109), representing a fan switch. Thus, there are three variations of tactile symbols (2, 103) in the same embodiment. All, however, fall within the commonly understood terminology of "tactile symbols" (2, 103).

Some embodiments of the invention (1) have a key as part of their structure. The key is a part of the map (1) upon which a chart is displayed comprising a list of the symbols (2, 8–11, 108–13–19, 113–119) and opposite and in proximity to them are briefly designated the object of interest the symbol (2, 103) represents. Thus, the key (20, 120) provides definitions for the symbols (2, 103). For example, for a simple rectangle (16, 116), the key might indicate that a toilet is thereby represented. The key (20, 120) may be made in the form of an embossment (3) or a cutout (4). In the same way that a tactile symbol (2, 103) has a face (7, 107), perimeter walls or sides (8, 108) and an underside (12, 112), so too does a key (20, 120) have a key face (21, 121), perimeter key walls (22, 122) and a key underside (23, 123), all of which are disposed in the same relative manner as their equivalent tactile symbol (2, 103) elements.

Without particular edification, one would not be expected to know that a symbol (2, 103) having a face (7, 107) shaped like a simple rectangle (16, 116) represents a toilet or that a face (7, 107) shaped like a triangle (17, 117) represents a urinal. To the degree that an association between a certain symbol (2, 103) and an object of interest it represents is not widely recognized, the invention's inclusion of a key (20, 120) is preferred. In most cases, definition in terms of braille (29) would be an appropriate type of key (20, 120), although other means of key (20, 120) communication might be desired. On the one hand, there are many blind people who cannot read braille. On the other, there are many partially blind people for whom the interpretive key (20, 120) could appropriately express what is referred to in the claims as "lettered narrative" (30). That terminology means expression in written word language. A key (20, 120) might also contain both lettered narrative (30) and braille (29). In either event, a blind person would in using the device (1), palpably review the key (20, 120) if present or, if not, merely the contents of the map (1) itself.

To the extent the symbols (2, 103) are shaped like the objects they designate and, thus, mimic them in miniaturized fashion, no key (20, 120) to symbol (2, 103) representation would be necessary. To the extent the symbols (2, 103) are simple enough to be easily interpreted or become universally recognized and popularized, whatever their design, the requirement for an interpretive key (20, 120) is minimized. Omission of the key (20, 120), if justified in other respects, reduces the risk of the user's confusion by removing what might otherwise be too many objects to feel and interpret. Certain instances of standardization are featured in the Americans with Disabilities Act (ADA). FIGS. 1–13 are all examples of restroom devices upon which keys (20, 120) have been omitted. However, while an interpretive key (20, 120) may be unnecessary where a restroom is concerned, reference to the particular sex the restroom is designated for is generally appropriate. To that end, FIG. 2 depicts at the foot of the device (1) the word "MEN" in braille and an embossed symbolic male figure (24). That piece (24) may also have one or more pegs (28) constructed upon it for attachment upon a pegboard (25).

The means by which one may learn the layout of an area of interest and the respective positional relationships of the objects of interest therein may be considered a method or process.

For enclosures which are more or less standard in size, configuration and in the arrangement of their fixtures, the device (1) may be mass produced at a plant and shipped complete to the site of placement. Examples include bathrooms on airplanes, trains or other transportation means. Although many of these are sufficiently small to allow one to find his or her way without a map or floor plan, it is reasonable to expect that blind persons would prefer to reduce touching of possibly contaminated fixtures or other structures to a minimum. Furthermore, for the sake of the blind, each armrest or other convenient locale on an airplane or train might contain uniform signage designating the bathroom's location. Many office and other commercial buildings standardize the size and configuration of bathrooms throughout the overall structure. Whether the concern is with such bathrooms or with other areas which might be uniform in design and layout, the device (1) may be conveniently preformed in manufacture. Thus, hotel and motel rooms are themselves frequently of uniform plan and for some of them, that uniformity is expressed throughout the entire world.

There are numerous instances, however, in which such floor plan uniformity does not exist. In the case of bathrooms, this is true of a building in which each one differs from another in shape and fixture arrangement. It would also be true of multiple areas other than bathrooms in many commercial or governmental buildings where for example, in the case of a courthouse, each courtroom has a different layout; or in the case of a performing arts center where each concert hall or theater is distinctly designed. In those cases of nonuniformity, it is best to permit the builder to assemble the device (1) at the site. In one embodiment, symbolic pieces for such use (8–11, 108–111, 13–19 or piece 24 as in FIG. 2) such as those depicted in FIGS. 6–13 permit assembly of the map at the site by fastening them to the plaque (5, 25) or underlying surface (6, 125) or, as might be appropriate in a bathroom for a symbol representing a toilet paper roll (18, 118), one representing a hand towel roll or dispenser or an electric hand dryer (19, 119) or one representing the switch for an electric fan (9, 109), by fastening them not to the plaque (5, 25) or underlying surface (6, 125) but to the sides (8, 108) of the walls of the rod-like interior area divisions (13, 113), such as those for the stalls, which are themselves so fastened in turn to the plaque (5, 25) or underlying surface (6, 125). If pegboard (25) is used as the plaque (5) or happens to be comprised in the underlying surface (6), it would be more convenient to attach symbols (2) comprised of pegged fixtures (103) directly into it. For embodiments having a plaque (5) other than of pegboard (25), an adhesive can be employed for placement as desired.

It would be best to place the device (1) near the entrance of the area of concern at a specific site where it would not only be readily accessible but where it would be most likely be sought out and discovered by the blind person. Thus, an appropriate placement for a restroom would be at the entrance very near the handle of the door. It might most desireably be placed upon the door itself, although at places such as airline terminals which employ only a door opening without an actual closure, the device (1) might be placed along a specified side at designated height. At a park or similar such public place, it might be placed upon an entrance structure such as a gate post. In the interest of universality, placement would be a fitting subject of legislative or administrative rule. The device should also be located at a height to conveniently accommodate a wheelchair user as well as a fully ambulatory person.

As discussed supra, while a plaque (5, 105) might be mounted upon a wall or door, a separate plaque (5, 109) becomes unnecessary where the door or wall itself (6, 25) serves that purpose. The surface (6, 25) need not otherwise be strictly planar but could for the sake of aesthetics have a curved aspect to it, either concave or convex. However, if so fashioned, the curvature should not be such as to confuse the user concerning its contents. A flat surface is, therefore, preferable. Further, the plaque (5, 105), when mounted, need not be relegated to any particular shape such as rectangular but might, for example, be circular, ovoid or of any other shape. However the plaque (5, 105) or underlying surface (6, 25) itself is deployed or shaped, there is merit in assembling the symbols (2, 103) for the mapped area upon it approximately to scale. That feature would permit the user to work his or her way through a roughly estimated distance between identifiable points. As shown directly by FIGS. 1 and 2, and from a different vantage point on FIGS. 3 and 4, some of the symbols on the invention (1) are short rod-like extensions representing doors (27, 127), either to the room itself or, in the case of a restroom, to the stalls within. The rod-like extensions representing doors (27, 127) must always be shown ajar oriented in the direction of opening.

As discussed, supra, restrooms are probably the most obvious and important locus for the device's (1) use. Nevertheless, as pointed out above, there are other applications which would also benefit blind users. Places other than those previously mentioned include transportation terminals, public meeting place entrances or forums accommodating events which might be attended for one reason or another by blind persons Entrance points for recreational sites might also be included, such as those for walkways into public parks, zoos or other outdoor areas of interest to the blind as well as the sighted. Even those blind persons who either choose to be unaccompanied in an appropriate recreational setting or those who in an emergency find themselves alone would benefit from a personal tactile study of such an area's layout and contents. Objects of interest sought for might include a public telephone, public restroom, police checking location, an information booth or any other place one might otherwise have to ask directions to. In all of such instances, since it is crucial that an unaccompanied blind person become aware of the device's (1) location before it can be used, an audio signal otherwise inobtrusive to the public might be used in conjunction with it. Even where such a signalling device is not employed, however, a large number of legally blind persons have limited sight abilities which would permit them to find their way to the device (1) in such a place.

It is anticipated the present invention's (1) palpation by a number of users would eventually subject it to wear. It should be constructed of a durable material, such as of sheet metal, glass, plastic, ceramic, wood or the like and its exterior should be well protected with an overlay, tempering, varnish or other appropriate covering.

I claim:

1. A tactile map comprising
   a plaque; and
   a plurality of attachable tactile symbols;
   the plaque further comprising;
   an observable surface comprised of pegboard; and
   a backside disposed opposite the observable surface; each
      of the attachable tactile symbols comprising
      a face;
      perimeter walls;
      an underside; and
      at least one peg disposed so as to project from the underside and of diameter sized for attachment by insertion into the pegboard;
   whereby the underside of the symbols may be attached to the observable surface of the plaque and disposed in positional relationships to one another representing a particular area of interest including objects therein and such that every member of a given class of objects is represented by a distinct one of the tactile symbols and each class of objects is represented, respectively, by a different one of the tactile symbols, whereby following such attachment and disposition, one may by means of tactile observation of the positional relationship of the symbols, become informed of the layout of the area represented and the respective positional relationships of objects therein.

2. The tactile map described in claim 1 further comprising an attachable tactile key of definitions for the tactile symbols, the key comprising
   a key face;
   perimeter key walls; and
   a key underside;
   the key further comprising means of communication in one of:
      braille; and
      lettered narrative;
   the underside of the key further comprising a plurality of pegs of diameter sized for attachment by insertion into the pegboard and disposed so as to project from the underside of the key;

whereby the underside of the key may be attached to a selected portion of the observable surface of the map separate from the tactile symbols and disposed thereon separate from them, such that confusion with them is avoided;

whereby one may by means of tactile observation of the key, become informed of the meaning of the respective classes of tactile symbols.

3. A method for informing visually impaired persons of the layout of a particular area of interest and the respective positional relationships of objects therein comprising:

emplacing upon a plaque comprising
an observable surface comprised of pegboard; and
a backside disposed opposite the observable surface;
a plurality of attachable tactile symbols, each comprising
a face;
perimeter walls;
an underside; and
at least one peg disposed so as to project from the underside and of diameter sized for attachment by insertion into the pegboard;

disposing the tactile symbols to represent the objects within the area of interest wherein the symbols depict the objects in a representative manner such that their positional relationships to one another, the angles and distances of separation between them, comprise those concerning the objects, such that their positional relationships comprise a tactile map of the area wherein every member of a given class of objects is represented by a distinct one of the tactile symbols and each class of objects is represented, respectively, by a different one of the tactile symbols.

whereby one may by means of tactile observation of the positional relationships of the symbols, become informed of the layout of the area represented and the respective positional relationships of objects therein.

* * * * *